United States Patent
Adachi

(10) Patent No.: US 11,667,031 B2
(45) Date of Patent: Jun. 6, 2023

(54) TEACHING METHOD

(71) Applicant: Seiko Epson Corporation, Tokyo (JP)

(72) Inventor: Hiroki Adachi, Matsumoto (JP)

(73) Assignee: SEIKO EPSON CORPORATION

( * ) Notice: Subject to any disclaimer, the term of this patent is extended or adjusted under 35 U.S.C. 154(b) by 408 days.

(21) Appl. No.: 16/886,922

(22) Filed: May 29, 2020

(65) Prior Publication Data

US 2020/0376657 A1  Dec. 3, 2020

(30) Foreign Application Priority Data

May 31, 2019 (JP) .............................. JP2019-102215

(51) Int. Cl.
   *B25J 9/16* (2006.01)

(52) U.S. Cl.
   CPC ............. *B25J 9/163* (2013.01); *B25J 9/1697* (2013.01)

(58) Field of Classification Search
   CPC ................................ B25J 9/163; B25J 9/1697
   See application file for complete search history.

(56) References Cited

U.S. PATENT DOCUMENTS

| | | | | |
|---|---|---|---|---|
| 5,447,403 A * | 9/1995 | Engler, Jr. | ............ | B25J 15/0009 294/111 |
| 8,819,591 B2 * | 8/2014 | Wang | .................. | G06F 3/04815 715/850 |
| 9,384,528 B2 * | 7/2016 | Aguirre-Valencia | ........................ | G16H 30/20 |
| 10,755,378 B2 * | 8/2020 | Aguirre-Valencia | ........................ | G06F 40/169 |
| 11,345,040 B2 * | 5/2022 | Oleynik | ............ | G05B 19/4183 |
| 2011/0235054 A1 * | 9/2011 | Koike | ..................... | B25J 9/1697 356/620 |
| 2015/0130794 A1 | 5/2015 | Katsuda | | |
| 2016/0151915 A1 * | 6/2016 | Nishi | ..................... | B25J 9/1697 901/6 |
| 2016/0288318 A1 | 10/2016 | Nakazato | | |
| 2017/0032529 A1 * | 2/2017 | De Villiers | ............ | B25J 9/1697 |
| 2017/0165841 A1 | 6/2017 | Kamoi | | |
| 2018/0004188 A1 * | 1/2018 | Yamaguchi | ................ | B25J 9/16 |
| 2018/0257234 A1 * | 9/2018 | Shimazu | ................ | B25J 9/1697 |

FOREIGN PATENT DOCUMENTS

| | | | |
|---|---|---|---|
| JP | 2009-297853 A | 12/2009 | |
| JP | 2015-093345 A | 5/2015 | |
| JP | 2016-197393 A | 11/2016 | |
| JP | 2017-104944 A | 6/2017 | |

* cited by examiner

*Primary Examiner* — Nicholas Kiswanto
(74) *Attorney, Agent, or Firm* — Harness, Dickey & Pierce, P.L.C.

(57) ABSTRACT

A teaching method includes imaging a teaching jig to acquire a captured image, detecting a position and a posture of the teaching jig based on the captured image, changing a position and a posture of a robot arm of a robot based on a result obtained by the detection to maintain a positional relation between the teaching jig and a control point of the robot arm, and acquiring the position and the posture of the robot arm as teaching information when a control device, which controls operation of the robot, acquires a teaching signal.

8 Claims, 14 Drawing Sheets

TEACHING METHOD

The present application is based on, and claims priority from JP Application Serial Number 2019-102215, filed May 31, 2019, the disclosure of which is hereby incorporated by reference herein in its entirety.

BACKGROUND

1. Technical Field

The present disclosure relates to a teaching method.

2. Related Art

There has been known a robot including a base and a robot arm supported by the base and including a plurality of arms. For example, the robot grips a target object with an end effector attached to the distal end of the robot arm, moves the target object to a predetermined place, and performs predetermined work such as assembly. In such a robot, before work is actually performed, the work needs to be taught to the robot.

Examples of the teaching method includes a teaching method described in JP-A-2009-297853 (Patent Literature 1).

The teaching method described in Patent Literature 1 is a method in which, first, a teacher applies an external force to a robot arm to move the robot arm to a desired position and a desired posture and, then, teaches the desired position and the desired posture to a robot.

However, in such a method, since the teacher performs the teaching while applying the external force to the robot to move the robot, the teacher is burdened with the teaching.

SUMMARY

The present disclosure can be implemented as the following configuration.

A teaching method according to an application example includes: imaging a teaching jig to acquire a captured image; detecting a position and a posture of the teaching jig based on the captured image; changing a position and a posture of a robot arm of a robot based on a result obtained by the detection to maintain a positional relation between the teaching jig and a control point of the robot arm; and acquiring the position and the posture of the robot arm as teaching information when a control device, which controls operation of the robot, acquires a teaching signal.

A teaching method according to an application example includes: detecting a position and a posture of a teaching jig based on information output by a sensor provided in the teaching jig; changing a position and a posture of a robot arm of a robot based on a result obtained by the detection to maintain a positional relation between the teaching jig and a control point of the robot arm; and acquiring the position and the posture of the robot arm as teaching information when a control device, which controls operation of the robot, acquires a teaching signal.

A teaching method according to an application example includes: imaging a teaching jig to acquire a captured image; detecting a position and a posture of the teaching jig based on the captured image; changing and displaying a position and a posture of a virtual robot arm based on a result obtained by the detection to maintain a positional relation between the teaching jig and a control point of the virtual robot arm associated with a position and a posture of a robot arm of a robot; and acquiring the position and the posture of the virtual robot arm as teaching information when a control device, which controls operation of the robot, acquires a teaching signal.

DESCRIPTION OF EXEMPLARY EMBODIMENTS

A teaching method according to the present disclosure is explained in detail below based on preferred embodiments shown in the accompanying drawings.

First Embodiment

Figure 1:
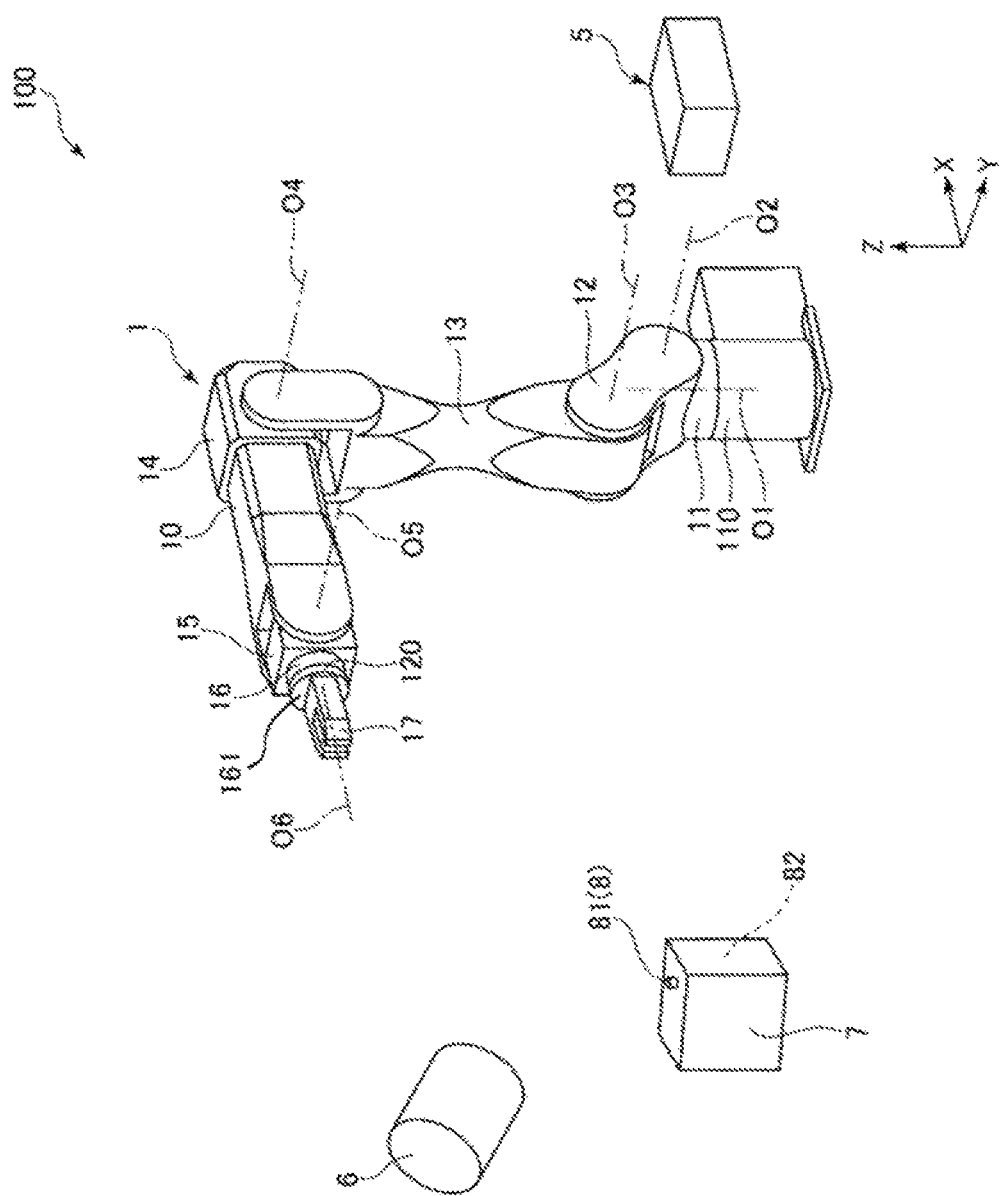
FIG. 1 is a perspective view of a robot system in which teaching is performed by a first embodiment of a teaching method according to the present disclosure.
Figure 2:
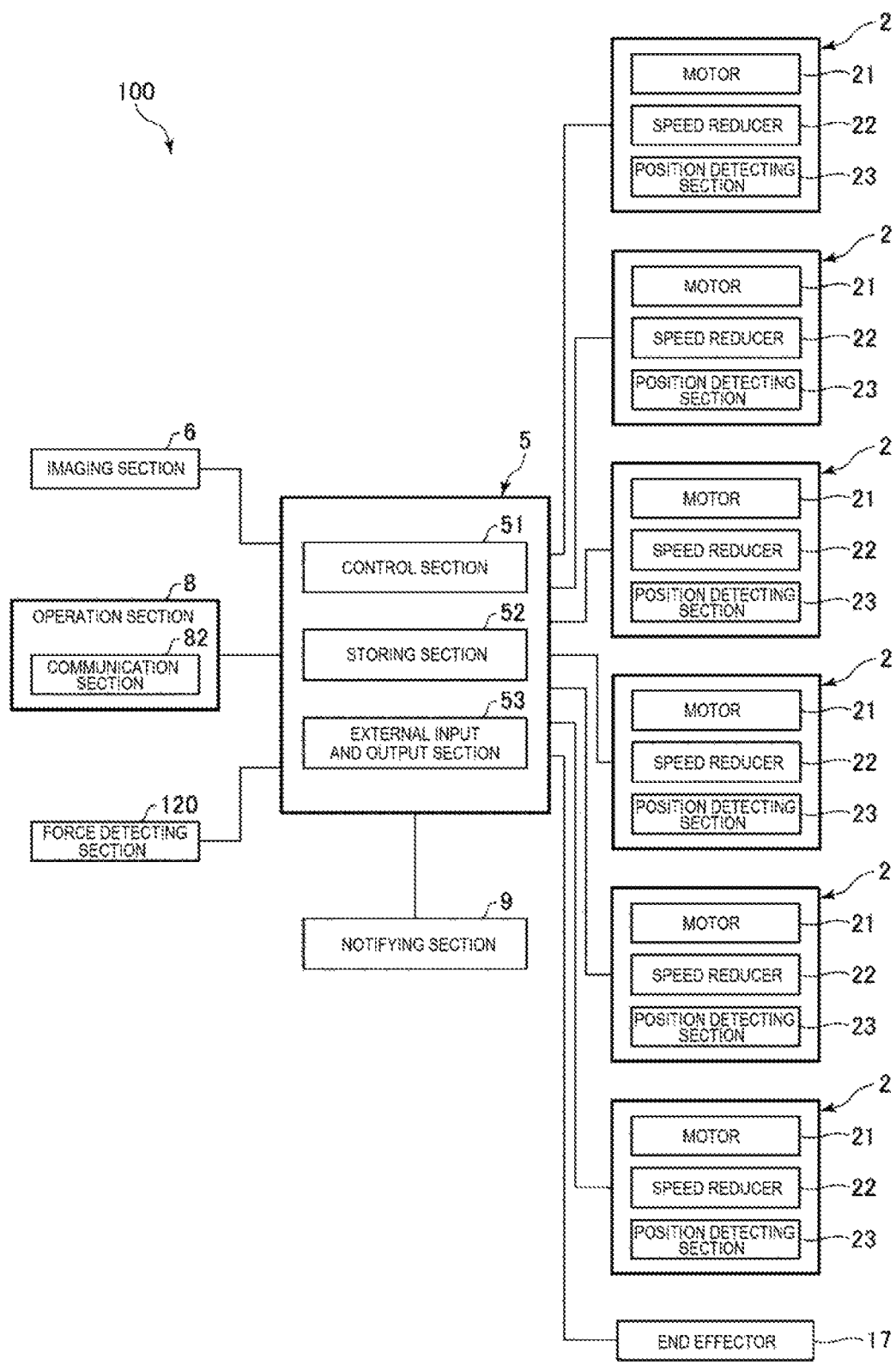
FIG. 2 is a block diagram of the robot system shown in FIG. 1.
Figure 3:
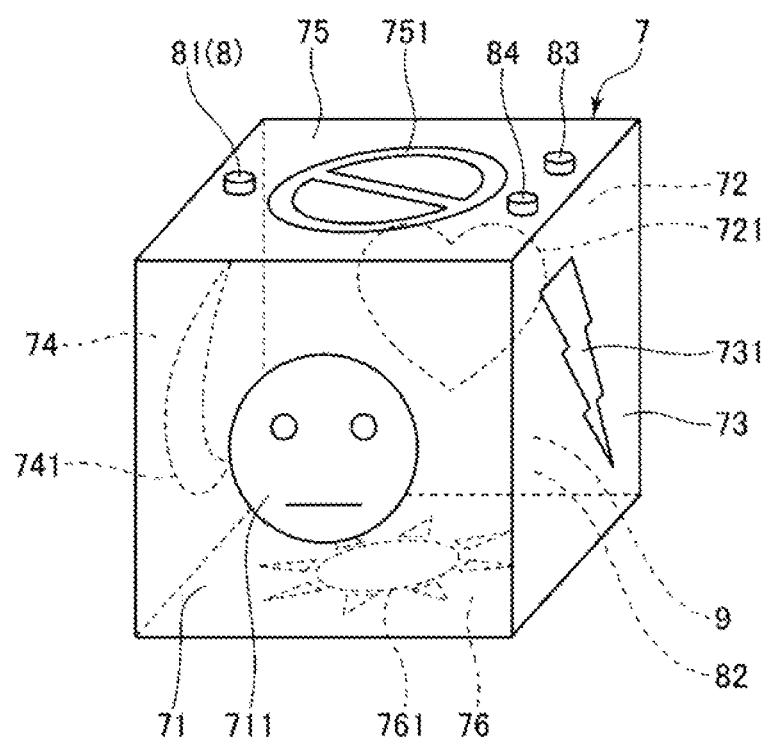
FIG. 3 is a perspective view of a teaching jig used for the teaching method according to the present disclosure.
Figure 4:
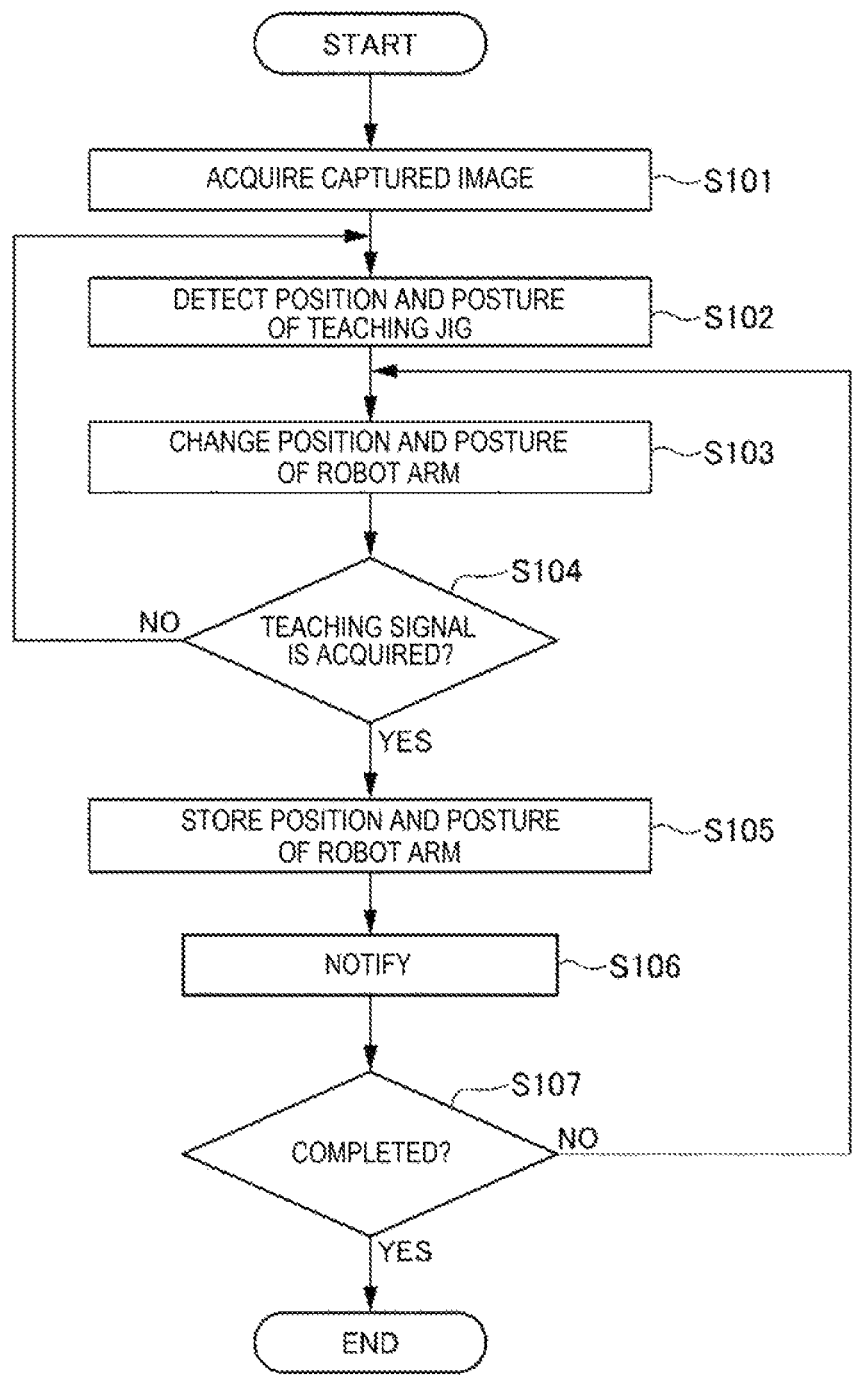
FIG. 4 is a flowchart for explaining a control operation of the robot system shown in FIG. 1.
Figure 5:
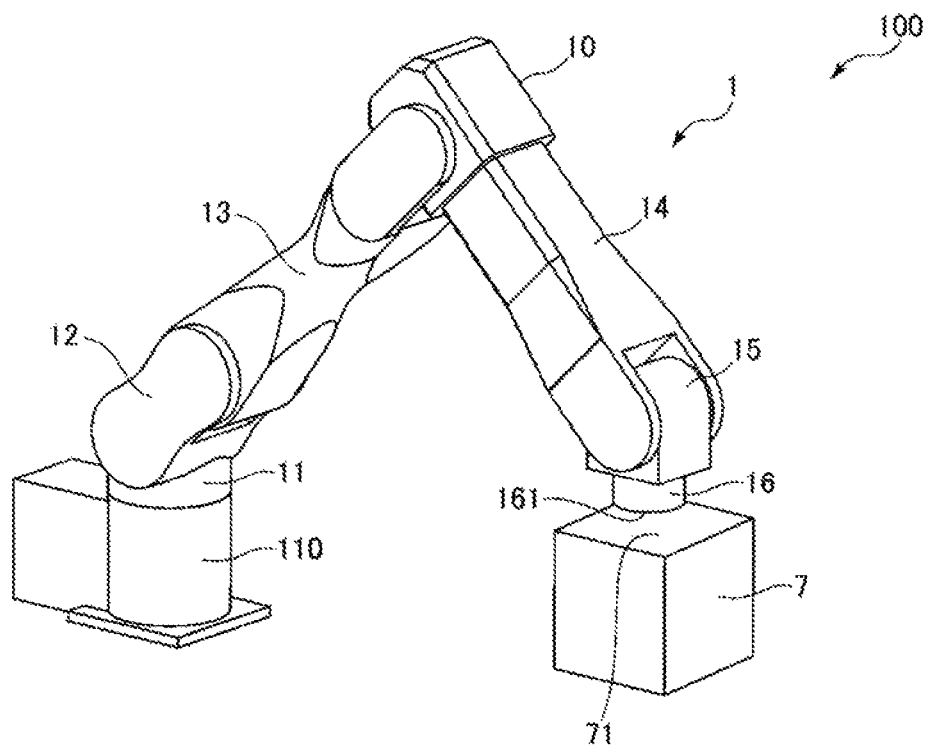
FIG. 5 is a perspective view of a robot in a state in which a position and posture changing step is performed.
Figure 6:
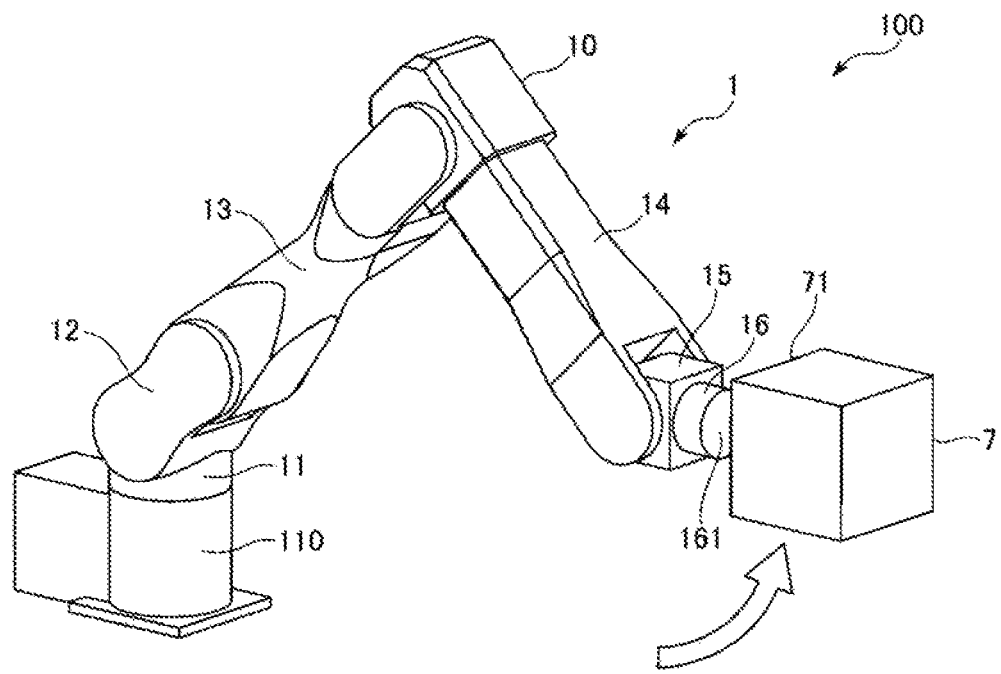
FIG. 6 is a perspective view of the robot in the state in which the position and posture changing step is performed.

FIG. 1 is a perspective view of a robot system in which teaching is performed by a first embodiment of a teaching method according to the present disclosure. FIG. 2 is a block diagram of the robot system shown in FIG. 1. FIG. 3 is a perspective view of a teaching jig used for the teaching method. FIG. 4 is a flowchart for explaining a control operation of the robot system shown in FIG. 1. FIG. 5 is a perspective view of a robot in a state in which a position and posture changing step is performed. FIG. 6 is a perspective view of the robot in the state in which the position and posture changing step is performed.

In FIG. 1, three axes (an X axis, a Y axis, and a Z axis) orthogonal to one another are illustrated. In the following explanation, a direction parallel to the X axis is referred to as "X-axis direction" as well, a direction parallel to the Y axis is referred to as "Y-axis direction" as well, and a direction parallel to the Z axis is referred to as "Z-axis direction" as well. In the following explanation, the distal end side of arrows shown in the figures is referred to as "+(plus)" and the proximal end side of the arrows is referred to as "− (minus)". The Z-axis direction coincides with the "vertical direction" and a direction parallel to an X-Y plane coincides with the "horizontal direction". The +(plus) side of the Z axis is represented as "upper" and the − (minus) side of the Z axis is represented as "lower".

A base 110 side of a robot arm 10 is referred to as proximal end side as well and the opposite side of the base 110, that is, a far side of the robot arm 10 is referred to as distal end side as well.

The teaching method according to the present disclosure is a teaching method of teaching, using an imaging section 6, a teaching jig 7, and an operation section 8, a predetermined position and a predetermined posture of the robot arm 10 to a robot system 100 including a robot 1 including the robot arm 10 and a control device 5 as shown in FIG. 1.

First, the configuration of the robot 1 is explained.

The robot 1 is a single-arm six-axis vertical articulated robot. An end effector 17 can be attached to the distal end portion of the robot 1. Although the robot 1 is a single-arm articulated robot in the configuration shown in FIG. 1, the robot 1 is not limited to this and may be, for example, a double-arm articulated robot.

The base 110 is a portion for attaching the robot 1 to any setting place. In this embodiment, the base 110 is set on, for example, a floor. The setting place of the base 110 is not limited to the floor or the like and may be, for example, a wall, a ceiling, or a movable truck.

As shown in FIG. 1, the robot arm 10 includes a plurality of arms: an arm 11, an arm 12, an arm 13, an arm 14, an arm 15, and an arm 16. The arms 11 to 16 are coupled in this order from the proximal end side toward the distal end side of the robot arm 10. A control point is set in the center of a distal end face 161 of the arm 16. A robot coordinate system having the control point as the origin is set in the robot 1. The control point may be set at the distal end of an end effector explained below.

The arms 11 to 16 are capable or turning with respect to the arms adjacent thereto or the base 110. The arm 11 is capable of turning around a first axis O1. The arm 12 is capable of turning around a second axis O2. The arm 13 is capable of turning around a third axis O3. The arm 14 is capable of turning around a fourth axis O4. The arm 15 is capable of turning around a fifth axis O5. The arm 16 is capable of turning around a sixth axis O6.

As shown in FIG. 1, the end effector 17 can be attached to the distal end of the robot arm 10, that is, the distal end of the arm 16. A mechanism for attaching the end effector 17 may be provided in the robot arm 10, may be provided in the end effector 17, or may be provided in both of the robot arm 10 and the end effector 17. In the configuration shown in FIG. 1, the end effector 17 includes two fingers and brings the two fingers closer to and separates the two fingers from each other to grip a work target object or a tool and release the gripping. The configuration of the end effector 17 is not limited to the configuration explained above and may include three or more fingers or may perform the gripping with suction.

A force detecting section 120 is provided between the arm 16 and the end effector 17 to be detachably attachable to the arm 16 and the end effector 17. The force detecting section 120 detects force applied to the end effector 17. This force includes a moment. The force detecting section 120 is configured by, for example, a six-axis force sensor or a three-axis force sensor. The force detecting section 120 outputs information concerning the detected force to the control device 5.

As shown in FIG. 2, the robot 1 includes a driving section 2 configured to drive the robot arm 10. The driving section 2 has a function of turning one arm with respect to the other arm or the base 110. In this embodiment, six driving sections 2 are provided respectively in the arms 11 to 16. Consequently, each of the arms 11 to 16 can be driven to turn with respect to the arms adjacent thereto or the base 110.

Since the driving sections 2 have the same configuration, one driving section 2 is representatively explained. The driving section 2 includes a motor 21, a speed reducer 22, and a position detecting section 23. As the motor 21, a servomotor such as an AC servomotor or a DC servomotor can be used. Such a motor 21 is electrically coupled to the control device 5 via a not-shown motor driver. The operation of the motor 21 is controlled when an energization condition is controlled by the control device 5.

The speed reducer 22 has a function of reducing rotation speed of the motor 21 and transmitting the rotation speed to the arms adjacent thereto. As the speed reducer 22, a planetary gear, a wave motion gear device, and the like can be used.

The position detecting section 23 is configured by, for example, a rotary encoder and is electrically coupled to the control device 5. Information concerning position information output from the position detecting section 23 is transmitted to the control device 5. The control device 5 performs control of the operation, that is, control for the postures of the arms 11 to 16 based on the position information.

The control device 5 is explained.

As shown in FIG. 1, the control device 5 has a function of controlling driving of the robot 1 and is communicably coupled to the robot 1. The coupling between the robot 1 and the control device 5 may be wired coupling or may be wireless coupling. In the configuration shown in FIG. 1, the control device 5 is disposed in a position different from the robot 1, that is, a position away from the robot 1. However, the control device 5 may be incorporated in the robot 1.

As shown in FIG. 2, the control device 5 includes a control section 51 including a processor, a storing section 52 including a memory, and an external input and output section 53 functioning as an acquiring section including an external interface (I/F). The components of the control device 5 are communicably coupled to one another via various buses.

The control section 51 includes a processor such as a CPU (Central Processing Unit) and executes various programs and the like stored in the storing section 52. Consequently, the control section 51 can realize processing such as control of the driving of the robot 1, various arithmetic operations, and determination. The control section 51 performs the teaching method according to the present disclosure based on the programs stored in the storing section 52. This is explained in detail below.

In the storing section 52, various programs executable by the control section 51 and reference data, thresholds, calibration curves, and the like used during a control operation are stored. The various programs include a program for executing the teaching method according to the present disclosure. Various data received by the external input and output section 53 can be stored in the storing section 52. The storing section 52 includes a volatile memory such as a RAM (Random Access Memory) and a nonvolatile memory such as a ROM (Read Only Memory). The storing section 52 is not limited to a nondetachable type and may include a detachable external storage device. The storing section 52 may be set in another place via a network such as a LAN (Local Area Network).

The external input and output section 53 includes an external interface (I/F) and is used for coupling the robot 1, a display device, an input device, and the like. The external input and output section 53 functions as an acquiring section that receives, that is, acquires a teaching signal from the operation section 8 explained below. The "teaching signal" means a signal transmitted from the operation section 8 when the operation section 8 explained below is operated, specifically, when a button 81 of the operation section 8 is operated by a teacher, that is a timing signal. Teaching is performed when the teacher operates the operation section 8 at any timing and a position and a posture of the robot arm 10 at the time when the external input and output section 53 acquires the signal transmitted from the operation section 8 are stored in the storing section 52 as the teaching information.

In "the position and the posture of the robot arm 10", the "position" refers to a coordinate in the robot coordinate system of the control point of the robot arm 10 and the "posture" refers to the postures of the arms 11 to 16. The postures of the arms 11 to 16 can be recognized based on output results from the position detecting sections respectively incorporated in the arms 11 to 16. The coordinate in the robot coordinate system of the control point of the robot arm 10 can be specified from the postures of the arms 11 to 16. Calibration curves indicating relationship between the postures and the coordinate are stored in the storing section 52.

When the external input and output section 53 acquires the teaching signal, the control section 51 specifies the position of the control point at that time based on detection results of the position detecting sections 23 and the calibration curves and sets the position, that is, the coordinate as a teaching point. Information concerning the teaching point is stored in the storing section 52 and used for work performed by the robot 1.

Other components may be further added to the control device 5 in addition to the components explained above. The various programs, the data, and the like stored in the storing section 52 may be stored in the storing section 52 in advance, may be stored in a recording medium such as a CD-ROM and provided from the recording medium, or may be provided via a network or the like.

An imaging section 6 is explained.

As shown in FIG. 1, the imaging section 6 is set in front of the robot 1 and images the robot 1 and the front of the robot 1, that is, a work region. For example, a CCD (Charge Coupled Device) camera or the like can be used as the imaging section 6. The imaging section 6 is electrically coupled to the control device 5. Data of a captured image acquired by the imaging section 6 is transmitted to the control device 5. The imaging section 6 is not limited to a CCD camera and may be a spectroscopic camera. In this case, spectral data, that is, a spectral spectrum is transmitted to the control device 5.

An image coordinate system is set in the image output by the imaging section 6. The robot coordinate system and the image coordinate system are in a state in which the robot coordinate system and the image coordinate system are associated with each other, that is, a state in which calibration for the robot coordinate system and the image coordinate system is finished. Therefore, any coordinate in the image captured by the imaging section 6 can be specified in the robot coordinate system. Accordingly, as explained below, the position of the teaching jig 7 in the captured image captured by the imaging section 6 can be specified in the robot coordinate system.

As shown in FIG. 3, the teaching jig 7 is used for the teaching method according to the present disclosure. When performing teaching, the teacher holds the teaching jig 7. The teaching jig 7 is imaged by the imaging section 6. The position and the posture of the teaching jig 7 are specified by the control device 5 in the captured image.

The teaching jig 7 is configured by a polyhedron, that is, a hexahedron. In this embodiment, the teaching jig 7 is configured by a cube having a surface 71, a surface 72, a surface 73, a surface 74, a surface 75, and a surface 76. The surface 71 and the surface 72 are parallel, the surface 73 and the surface 74 are parallel, and the surface 75 and the surface 76 are parallel. Among the surface 71, the surface 72, the surface 73, the surface 74, the surface 75, and the surface 76, any surface is referred to as first surface as well and any surface different from the first surface is referred to as second surface as well.

The teaching jig 7 includes a marker 711 provided on the surface 71, a marker 721 provided on the surface 72, a marker 731 provided on the surface 73, a marker 741 provided on the surface 74, a marker 751 provided on the surface 75, and a marker 761 provided on the surface 76.

The marker 711, the marker 721, the marker 731, the marker 741, the marker 751, and the marker 761 are different from one another in at least one of colors, patterns, and shapes. Which marker is provided on which surface is stored in the storing section 52 of the control device 5. Consequently, the control device 5 can specify the position and the posture of the teaching jig 7 in the captured image.

In this embodiment, the marker 711 is formed in a shape representing a human face. The marker 721 is formed in a shape of a heart. The marker 731 is formed in a shape representing lightening. The marker 741 is formed in a shape representing a crescent. The marker 751 is formed in a shape having a straight line drawn on the inner side of a ring. The marker 761 is formed in a shape representing the sun. The configuration shown in FIG. 3 is an example. The markers are not limited to the configuration shown in FIG. 3 and may have any shapes, colors, or patterns if the markers can be distinguished from the other markers.

Such a teaching jig 7 is imaged by the imaging section 6 in a state in which the teaching jig 7 is held by the teacher as explained above. In a captured image of the imaging section 6, the control section 51 can specify the position and the posture of the teaching jig 7 by recognizing and specifying one to three markers among the markers 711 to 761. In other words, the surfaces 71 to 76, on which the markers 711 to 761 are provided, function as detection surfaces for detecting the position and the posture of the teaching jig 7. Since the at least one of the colors, the patterns, and the shapes of the markers 711 to 761 are different from one another, the control section 51 can identify the markers 711 to 716 in the captured image.

In this way, the teaching jig 7 includes the six surfaces 71 to 76. The surfaces 71 to 76 include the markers 711 to 716 different from one another. In other words, the teaching jig 7 includes the first surface and the second surface. A marker disposed on the first surface and a marker disposed on the second surface are different. Consequently, it is possible to detect the position and the posture of the teaching jig 7.

In the robot system 100, when the teacher moves the teaching jig 7 to a desired position, the robot arm 10 changes the posture and moves following the teaching jig 7. Specifically, the control section 51 drives the robot arm to maintain a state in which the surface 71 and the distal end face 161 of the arm 16 are parallel while the distal end of the robot arm 10, that is, the distal end face 161 of the arm 16 adheres to or is separated a fixed distance from the surface 71. Consequently, the teacher can change, with a simple method of moving the teaching jig 7, the position and the posture of the robot arm 10 without touching the robot arm 10.

For example, when the teacher lifts the teaching jig 7 from the state shown in FIG. 5 while rotating the teaching jig 7 vertically upward, as shown in FIG. 6, the position and the posture of the robot arm 10 are changed such that the distal end face 161 of the arm 16 is parallel to the surface 71 of the teaching jig 7 and keeps a designated distance from the surface 71.

When the position and the posture of the robot arm 10 are changed, the imaging section 6 may always perform imaging and transmit a captured image to the control device 5 as a moving image or may continuously capture still images and transmit a plurality of captured images to the control device 5.

A surface that the distal end face 161 is caused to follow among the surfaces 71 to 76 can be set in advance. A separation distance between the set surface and the distal end face 161 can also be set. These settings can be performed by, for example, inputting information to the control device 5 using a not-shown input device.

When the position and the posture of the robot arm 10 reaches the desired position and the desired posture, the teacher operates the operation section 8. With this operation as a trigger, the position and the posture of the robot arm 10 at this time are stored in the storing section 52. That is, teaching is performed.

The operation section 8 is explained.

The operation section 8 shown in FIG. 3 is operated by the teacher to transmit a teaching signal to the control device 5. The control device 5, which receives the teaching signal, stores information concerning the position and the posture of the robot arm 10 in the storing section 52 based on the position of the control point and position information of the position detecting sections 23 at that time. Then, the teaching is completed.

As shown in FIG. 3, in this embodiment, the operation section 8 is provided in the teaching jig 7. The operation section 8 includes the button 81 provided on the surface 75 and a communication section 82 incorporated in the teaching jig 7. The button 81 is configured by, for example, a mechanical button. The button 81 is pressed by the teacher, whereby the communication section 82 transmits a teaching signal to the external input and output section 53 of the control device 5.

In this way, the operation section 8 is provided in the teaching jig 7. Consequently, the teacher can smoothly press the button 81 after moving the teaching jig 7. Accordingly, the teacher can smoothly and quickly shift from a position and posture changing step to a teaching-information acquiring step explained below.

The button 81 is not limited to the mechanical button and may be a switch mechanism or a pressure-sensitive or electrostatic contact button.

The operation section 8 may be provided in a position different from the teaching jig 7. In this case, a footswitch of the like can be used as the operation section 8. The operation section 8 may be provided in the control device 5 or the base 110.

An emergency stop button 83 functioning as an emergency stop operation section for stopping the operation of the robot 1 and an operation permission button 84 functioning as an operation permission operation section for releasing an emergency stop state are provided on the surface 75. When the teacher presses the emergency stop button 83, an emergency stop signal for stopping the operation of the robot 1 is transmitted from the communication section 82 to the control device 5. Consequently, the robot 1 can be emergently stopped during the teaching. When the teacher presses the operation permission button 84 in the emergency stop state, an operation permission signal for releasing the emergency stop state is transmitted from the communication section 82 to the control device 5. Since the teaching jig 7 includes the emergency stop button 83 and the operation permission button 84 explained above, it is possible to improve safety and smoothly resume the teaching.

A notifying section 9 is explained.

The notifying section 9 performs a notifying step explained below. In this embodiment, the notifying section 9 is provided in the teaching jig 7. The notifying section 9 includes, for example, a vibrating element and vibrates when a signal including information indicating that teaching is completed is transmitted from the control device 5 to the communication section 82. Consequently, vibration is transmitted to a hand of the teacher holding the teaching jig 7. The teacher can recognize that the teaching is completed.

The configuration of the notifying section 9 is not limited to the above. For example, the notifying section 9 may perform notification with sound or may perform notification with a lamp or display on a display section or the like. The notifying section 9 may be provided in a place other than the teaching jig 7.

A control operation performed by the control device 5, that is, the teaching method according to the present disclosure is explained with reference to the flowchart of FIG. 4.

First, the robot 1 and the imaging section 6 are disposed in positions shown in FIG. 1. In other words, the robot 1 and the imaging section 6 are disposed such that the imaging section 6 can image a work range of the robot arm 10. The control device 5 starts the following steps in a state in which the teacher holds the teaching jig 7 in a photographing field of the imaging section 6.

First, in step S101, the control device 5 acquires a captured image. In other words, the control device 5 acquires a captured image of the teaching jig 7 in the work range of the robot 1 captured by the imaging section 6. Step S101 is an imaging step. As explained above, the captured image may be a plurality of still images or may be a moving image.

Subsequently, in step S102, the control device 5 detects the position and the posture of the teaching jig 7 based on the captured image acquired in step S101. In this embodiment, the position and the posture of the teaching jig 7 can be specified, that is, detected by specifying at least one of the markers 711 to 761 of the teaching jig 7 in the captured image as shown in FIG. 3. More accurate detection can be performed by estimating a posture based on views, for example, areas of the surfaces 71 to 76 in an image.

Information concerning the position and the posture of the teaching jig 7 detected in step S102 is stored in the storing section 52 at any time. As the information concerning the position and the posture of the teaching jig 7, coordinates of any parts such as the corners and the centers of the surfaces of the teaching jig 7 are converted into a robot coordinate system and stored. Step S102 is a detecting step.

Subsequently, in step S103, the control device 5 changes the position and the posture of the robot arm 10 based on a result obtained by the detection in step S102, that is, the stored coordinates in the robot coordinate system. For example, the control device 5 drives the arms 11 to 16 to maintain a state in which the surface 71 and the distal end face 161 of the arm 16 are parallel while keeping the distal end of the robot arm 10, that is, the distal end face 161 of the arm 16 adhering to or separated a fixed distance from the surface 71.

Step S103 is a position and posture changing step. When the teacher moves the teaching jig 7 to a desired position through such steps S101 to S103 and the position and the posture of the teaching jig 7 are changed, the position and the posture of the robot arm 10 are changed to maintain a positional relation between the teaching jig 7 and the control point of the robot arm 10 according to the change of the position and the posture of the teaching jig 7. The positional relation is an expression including both of a relation between the positions and a relation between the postures of the teaching jig 7 and the control point of the robot arm 10.

Accordingly, the teacher can change, with a simple method of holding and moving the teaching jig 7, the position and the posture of the robot arm 10 without applying an external force to the robot arm 10. The teacher presses the button 81 of the operation section 8 when the robot arm 10 reaches the desired position and the desired posture while visually confirming the position and the posture of the robot arm 10.

In step S104, the control device 5 determines whether a teaching signal is acquired, that is, whether the button 81 is pressed and a teaching signal is received from the communication section 82. When determining that a teaching signal is not acquired, the control device 5 returns to step S102 and repeats the following steps. In other words, the robot arm 10 is driven to follow the teaching jig 7 until a teaching signal is acquired.

When determining in step S104 that a teaching signal is received, in step S105, the control device 5 stores the position and the posture of the robot arm 10. In other words, as explained above, the control device 5 specifies, based on detection results of the position detecting sections 23 and the calibration curves at the time when the teaching signal is acquired, the position of the control point at that time in the robot coordinate and stores a coordinate of the position in the storing section 52 as a teaching point. The control device 5 also stores position information received from the position detecting sections 23 at that time, that is, the postures of the arms 11 to 16 in the storing section 52. The teaching point and the postures of the arms 11 to 16 are teaching information. When the control device 5 determines that the teaching information is acquired, this means that a teaching-information acquiring step is performed.

In this way, the teaching-information acquiring step is performed using the operation section 8 that is operated to transmit a teaching signal to the control device 5. In other words, the teaching information is acquired using the operation section 8 that is operated to transmit a teaching signal to the control device 5. Consequently, the teacher can transmit the teaching information to the control device 5 at desired timing.

In step S106, the control device 5 operates the notifying section 9 to notify that the teaching is completed. Step S106 is a notifying step. In this way, the teaching method according to the present disclosure includes the notifying step of notifying that the teaching is completed. The notifying step is performed by the notifying section 9 provided in the teaching jig 7. In other words, the completion of the teaching is notified by the notifying section 9 provided in the teaching jig 7. Consequently, the teacher can recognize that the teaching is completed.

In step S107, the control device 5 determines whether all teachings are completed. This determination is performed based on whether a completion instruction is input to the control device 5 from the teacher. For example, when there are a plurality of teaching points, since the completion instruction is not input, the control device 5 returns to step S102 and sequentially repeats the following steps.

A button for inputting the completion instruction may be provided in the teaching jig 7 or the control device 5. The completion instruction may be input by operating the button.

As explained above, in the teaching method according to the present disclosure, the teaching jig 7 is imaged to acquire a captured image, the position and the posture of the teaching jig 7 are detected based on the captured image, the position and the posture of the robot arm 10 are changed based on a result obtained by the detection to maintain a positional relation between the teaching jig 7 and the control point of the robot arm 10 of the robot 1, and the position and the posture of the robot arm 10 are acquired as teaching information when the control device 5, which controls the operation of the robot 1, acquires a teaching signal. According to the present disclosure, the teacher can perform teaching without applying an external force to the robot arm 10. Therefore, it is possible to reduce a burden on the teacher.

In the case of this embodiment, in step S102, an initial position and an initial posture of the teaching jig 7 are detected based on the captured image of the imaging section 6. However, the teacher may directly input the initial position and the initial posture of the teaching jig 7 to the control device 5.

Second Embodiment

Figure 7:
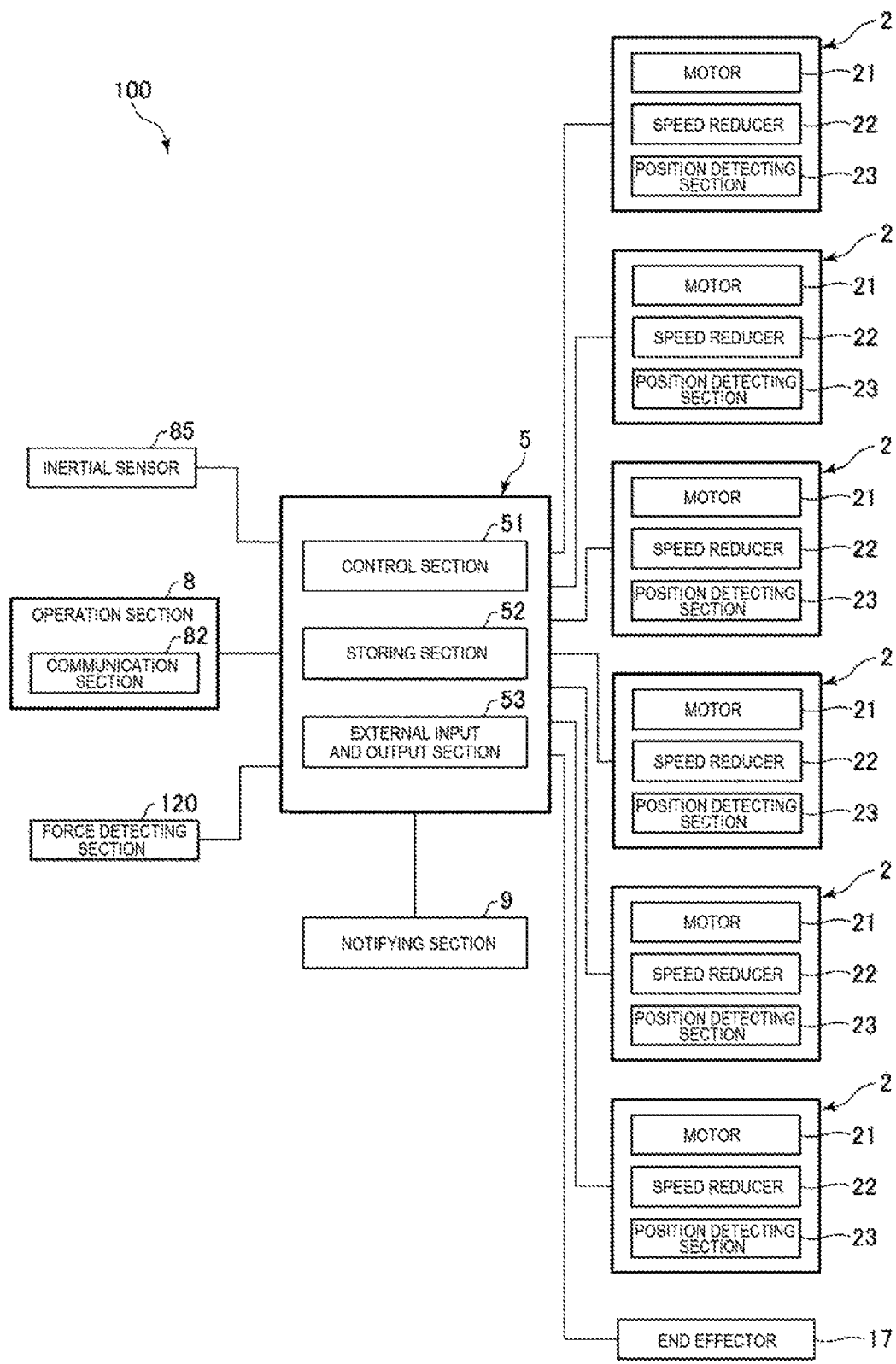
FIG. 7 is a block diagram of a robot system in which teaching is performed by a second embodiment of the teaching method according to the present disclosure.
Figure 8:
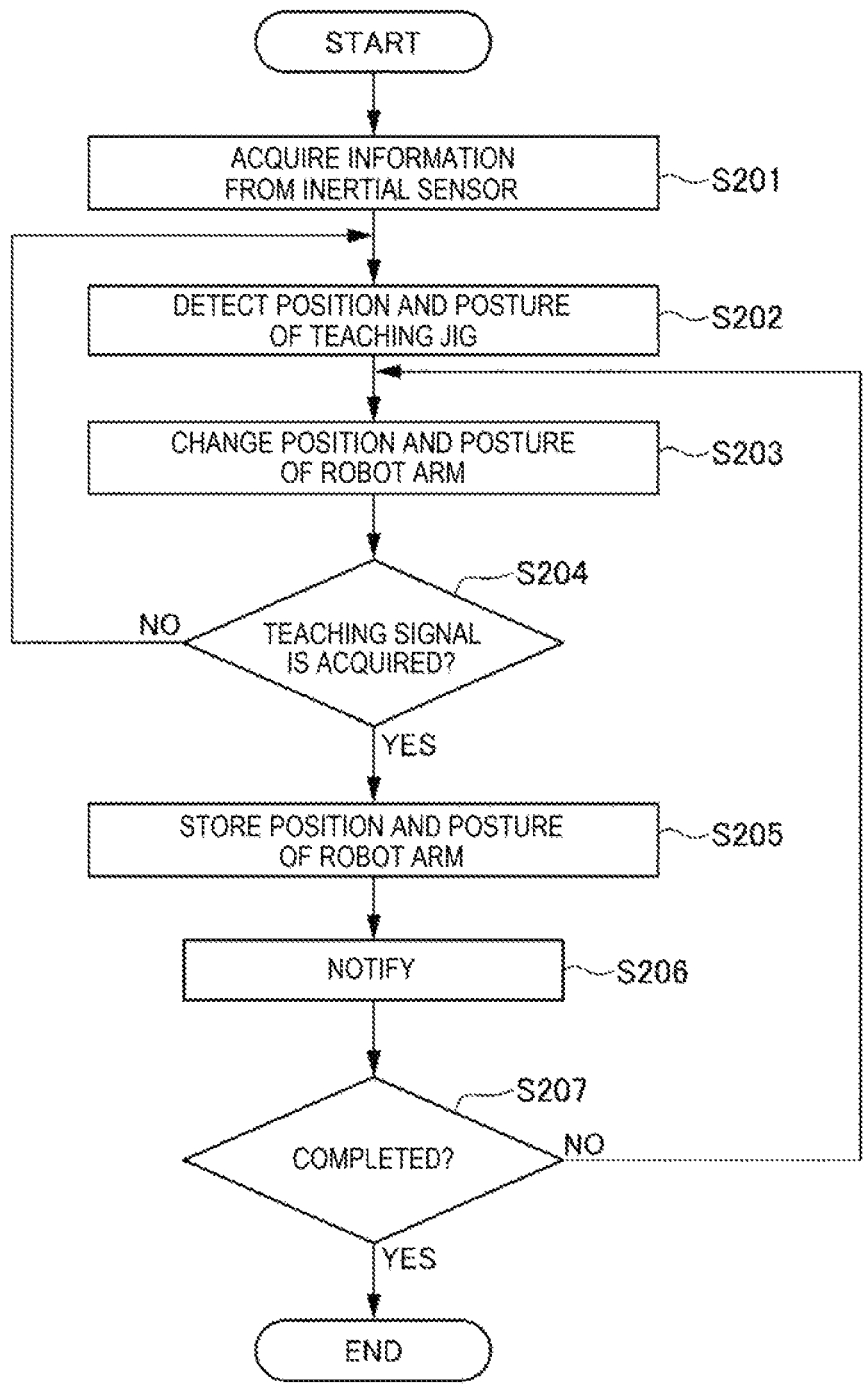
FIG. 8 is a flowchart for explaining a control operation of the robot system shown in FIG. 7.

FIG. 7 is a block diagram of a robot system in which teaching is performed by a second embodiment of the teaching method according to the present disclosure. FIG. 8 is a flowchart for explaining a control operation of the robot system shown in FIG. 7.

This embodiment is the same as the first embodiment explained above except that the imaging section is omitted and a sensor is used. In the following explanation, concerning this embodiment, differences from the first embodiment are mainly explained and explanation concerning similarities to the first embodiment is omitted.

As shown in FIG. 7, in this embodiment, an inertial sensor 85 is used as the sensor. Although not shown in FIG. 7, the inertial sensor 85 is incorporated in the teaching jig 7. When a teacher moves the teaching jig 7, information concerning the movement of the teaching jig 7 is transmitted to the control device 5. The transmission may be performed by the communication section 82 or may be performed by a separately provided communication section.

The control device 5 can detect the position and the posture of the teaching jig 7 based on information output by the inertial sensor 85, that is, relationship between a displacement amount and a displacement direction of the teaching jig 7 and the position and the posture of the teaching jig 7. The relationship means, for example, calibration curves stored in the storing section 52 in advance. The teacher directly inputs an initial position and an initial posture of the teaching jig 7 to the control device 5.

A control operation performed by the control device 5, that is, the teaching method according to the present disclosure is explained with reference to the flowchart of FIG. 8.

The teaching method explained below is the same as the teaching method in the first embodiment except that steps S201 and S202 are different. In other words, steps S203 to S207 are the same as steps S103 to S107 explained in the first embodiment. Therefore, only steps S201 and S202 are explained below.

First, the teacher directly inputs the initial position and the initial posture of the teaching jig 7 to the control device 5. This input is performed using a not-shown input device. The teacher holds and moves the teaching jig 7.

In step S201, the control device 5 acquires information from the inertial sensor 85.

Subsequently, in step S202, the control device 5 detects the position and the posture of the teaching jig 7 based on the information acquired in step S201. This detection is performed based on the calibration curves explained above and the initial position and the initial posture of the teaching jig 7.

Subsequently, the teaching is completed through steps S203 to S207, that is, the position and posture changing step, the teaching-information acquiring step, and the notifying step.

In this way, in the teaching method according to the present disclosure, the position and the posture of the teaching jig 7 are detected based on the information output by the inertial sensor 85, which is the sensor provided in the teaching jig 7, the position and the posture of the robot arm 10 are changed based on a result obtained by the detection to maintain a positional relation between the teaching jig 7 and the control point of the robot arm 10 of the robot 1, and the position and the posture of the robot arm 10 are acquired as teaching information when the control device 5, which controls the operation of the robot 1, acquires a teaching signal. According to the present disclosure, the teacher can perform teaching without applying an external force to the robot arm 10. Therefore, it is possible to reduce a burden on the teacher.

Third Embodiment

Figure 9:
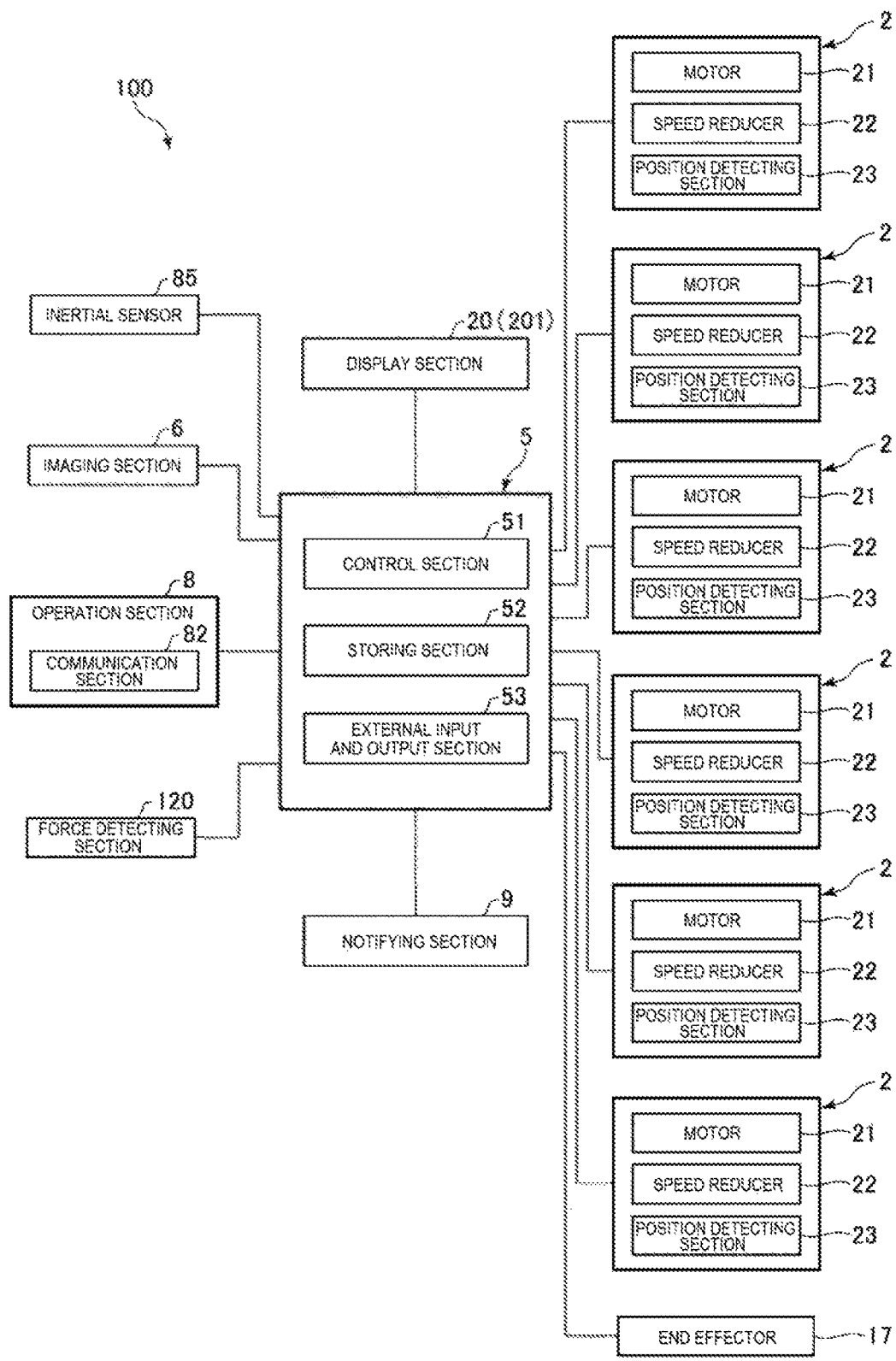
FIG. 9 is a block diagram of a robot system in which teaching is performed by a third embodiment of the teaching method according to the present disclosure.
Figure 10:
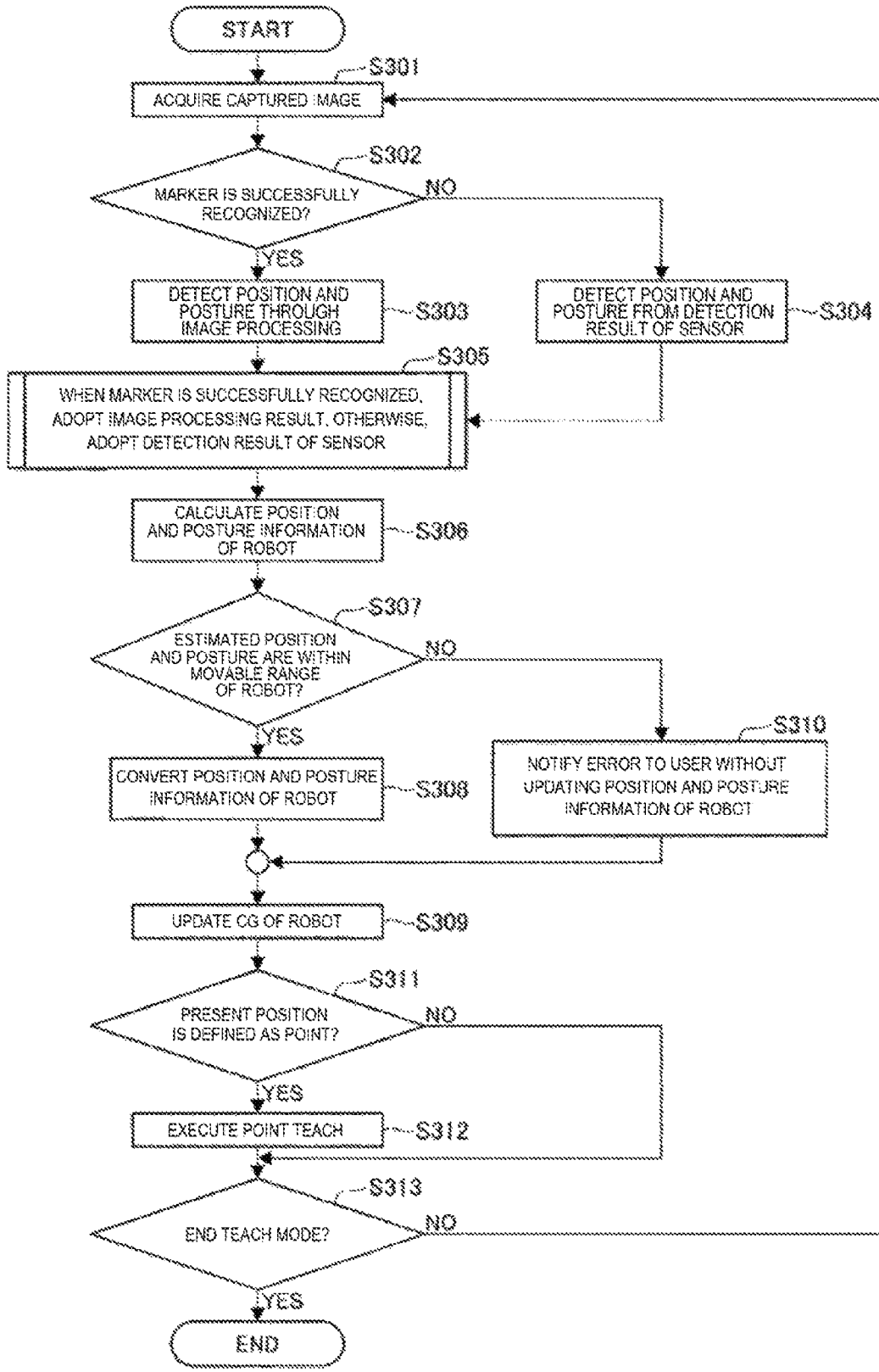
FIG. 10 is a flowchart for explaining a control operation of the robot system shown in FIG. 9.
Figure 11:
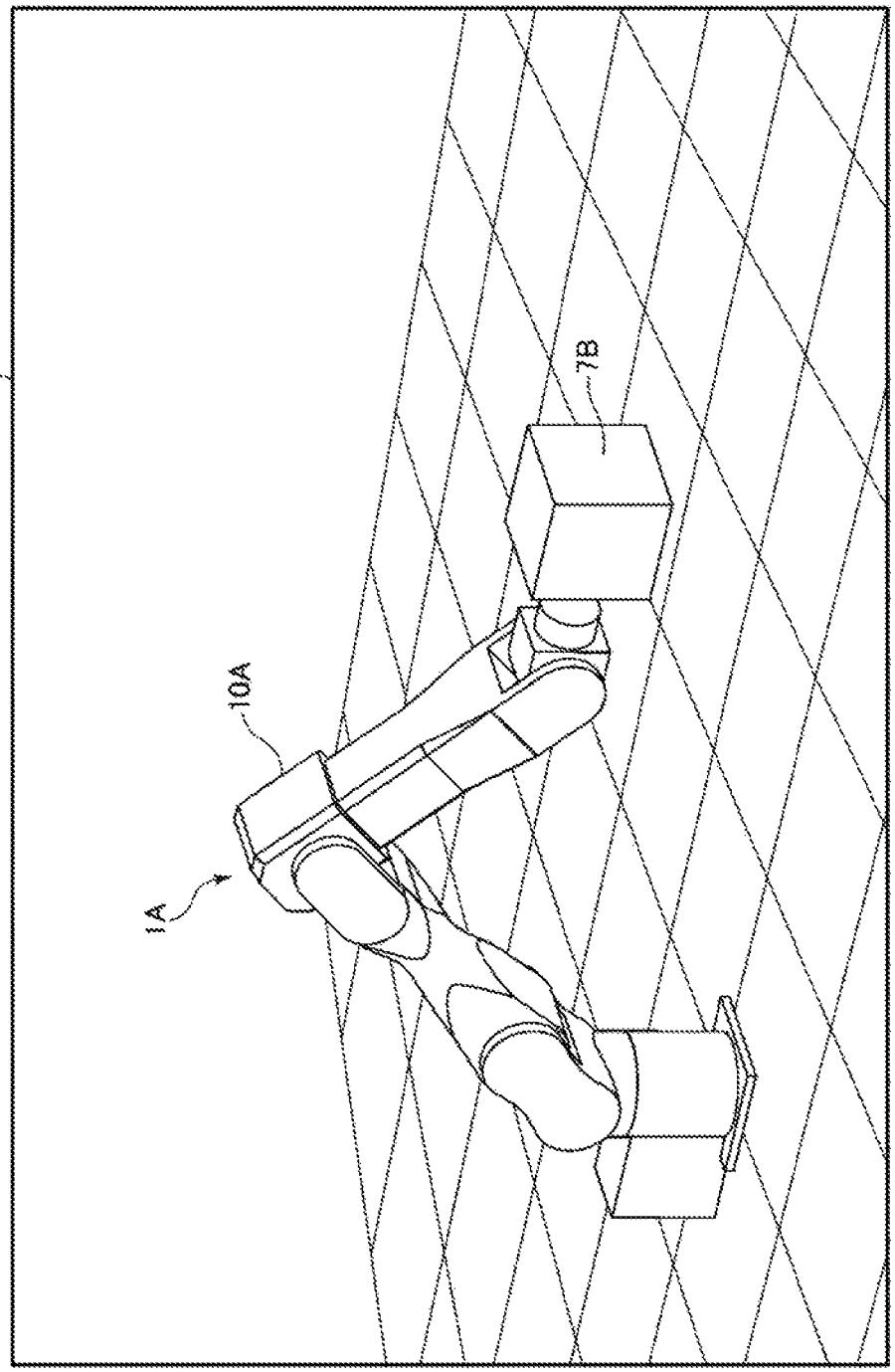
FIG. 11 is a diagram showing a simulation moving image displayed on a display section.
Figure 12:
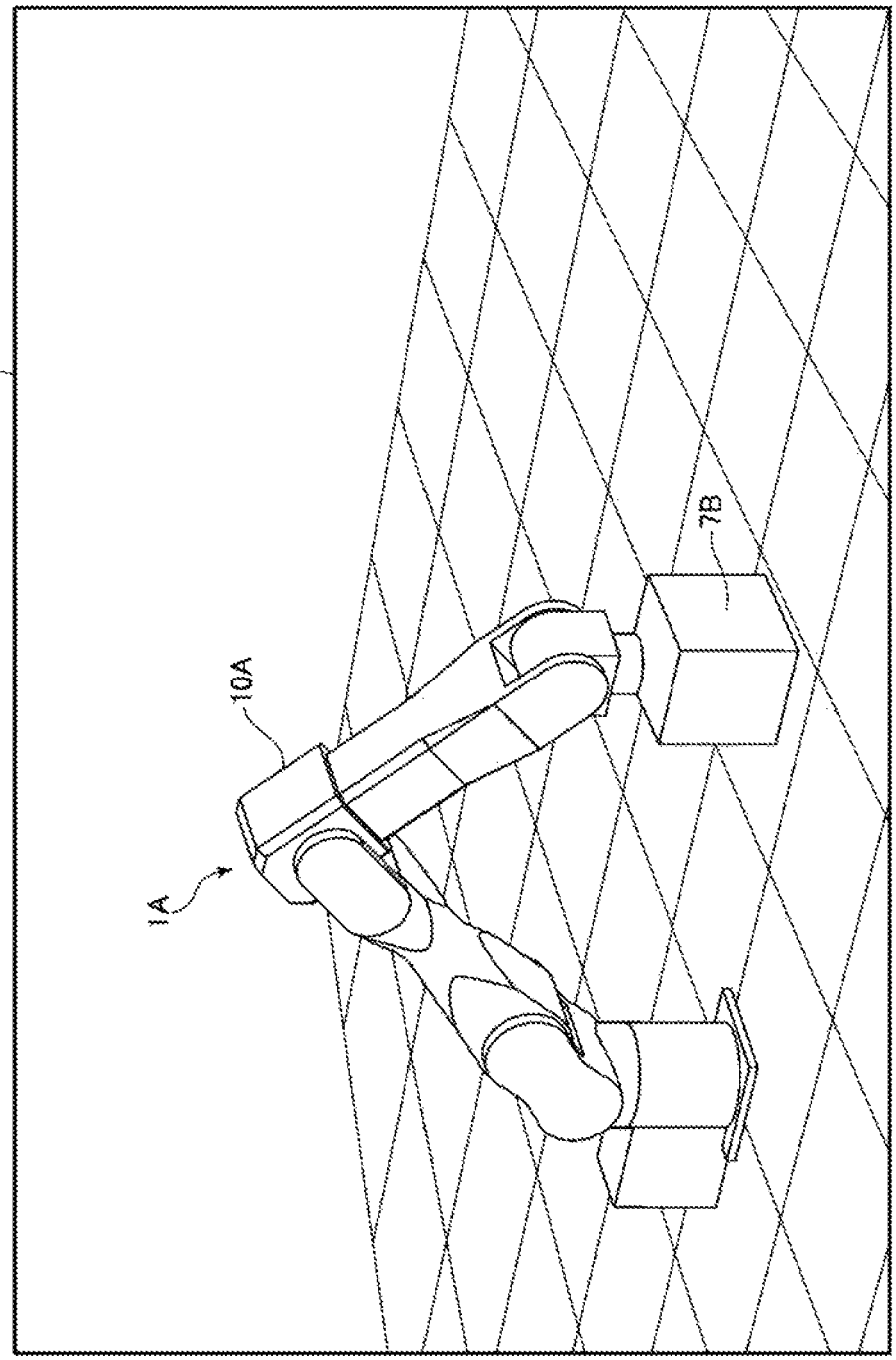
FIG. 12 is a diagram showing the simulation moving image displayed on the display section.

FIG. 9 is a block diagram of a robot system in which teaching is performed by a third embodiment of the teaching method according to the present disclosure. FIG. 10 is a flowchart for explaining a control operation of the robot system shown in FIG. 9. FIGS. 11 to 14 are diagrams showing a simulation moving image displayed on a display section. In FIGS. 11 to 14, illustration of an X axis, a Y axis, and a Z axis of a robot coordinate system is omitted. However, these three axes may be displayed.

The third embodiment is explained below.

As shown in FIG. 9, in this embodiment, teaching is performed using the inertial sensor 85, the imaging section 6, a display section 20, and the teaching jig 7 shown in FIG. 1. Although not shown in FIG. 9, the inertial sensor 85 is incorporated in the teaching jig 7.

The display section 20 includes a display screen 201 that displays a simulation moving image explained below. The display section 20 may be any display if the display is a display that can display an image to a teacher such as a liquid crystal display device, an organic EL display device, an aerial imaging device, a head mounted display, and a head-up display. Above all, the display section 20 is desirably a wearable device represented by the head mounted display.

In this embodiment, the control section 51 generates a simulation moving image based on a captured image of the imaging section 6 or information acquired from the inertial sensor 85 and displays the simulation moving image on the display section 20. In this simulation moving image, a virtual robot 1A associated with the robot 1 and a virtual teaching jig 7B associated with the teaching jig 7 are displayed. The control section 51 executes various other steps explained below.

A control operation performed by the control device 5, that is, the teaching method according to the present disclosure is explained with reference to the flowchart of FIG. 10.

First, the robot 1 and the imaging section 6 are disposed in the positions shown in FIG. 1. In other words, the robot 1 and the imaging section 6 are disposed such that the imaging section 6 can image a work range of the robot arm 10. The control device 5 starts the following steps in a state in which the teacher holds the teaching jig 7 in a photographing field of the imaging section 6.

First, in step S301, the control device 5 acquires a captured image. In other words, the control device 5 acquires a captured image of the teaching jig 7 in the work range of the robot 1 captured by the imaging section 6. Step S301 is the imaging step. As explained above, the captured image may be a plurality of still images or may be a moving image.

Subsequently, in step S302, the control device 5 determines whether a marker of the teaching jig 7 is successfully recognized. When determining that the marker is successfully recognized, in step S303, the control device 5 detects the position and the posture of the teaching jig 7 based on the captured image acquired in step S301. Step S303 is the detecting step and is the same as step S102 in the first embodiment.

When determining in step S302 that the marker of the teaching jig 7 is not successfully recognized, in step S304, the control device 5 acquires information from the inertial sensor 85. Steps S304 is the same as step S201 in the second embodiment.

In step S305, when the marker of the teaching jig 7 is successfully recognized, the control device 5 adopts the position and the posture of the teaching jig 7 detected based on the captured image. When the marker of the teaching jig 7 is not successfully recognized, the control device 5 adopts the position and the posture of the teaching jig 7 detected based on the information acquired from the inertial sensor 85.

Subsequently, in step S306, the control device 5 calculates a position and a posture of the robot arm 10 for the distal end face 161 of the arm 16 to follow the teaching jig 7 in the present position and the present posture.

Subsequently, in step S307, the control device 5 determines whether the position and the posture of the robot arm 10 detected in step S306 are located within a movable range of the robot arm 10. The movable range of the robot arm 10 is stored in the storing section 52, for example, as a coordinate of a robot coordinate system.

When determining in step S307 that the position and the posture of the robot arm 10 detected in step S306 are located within the movable range of the robot arm 10, in step S308, the control device 5 converts the detected position and the detected posture of the robot arm 10 into information concerning a position and a posture of the virtual robot 1A. In other words, the control device 5 calculates a position and a posture of a virtual robot arm 10A of the virtual robot 1A in the simulation moving image. In step S309, the control device 5 displays the virtual robot arm 10A updated to the position and the posture of the virtual robot arm 10A calculated in step S308 (see, for example, FIGS. 11 and 12). Step S309 is a display step.

Figure 13:
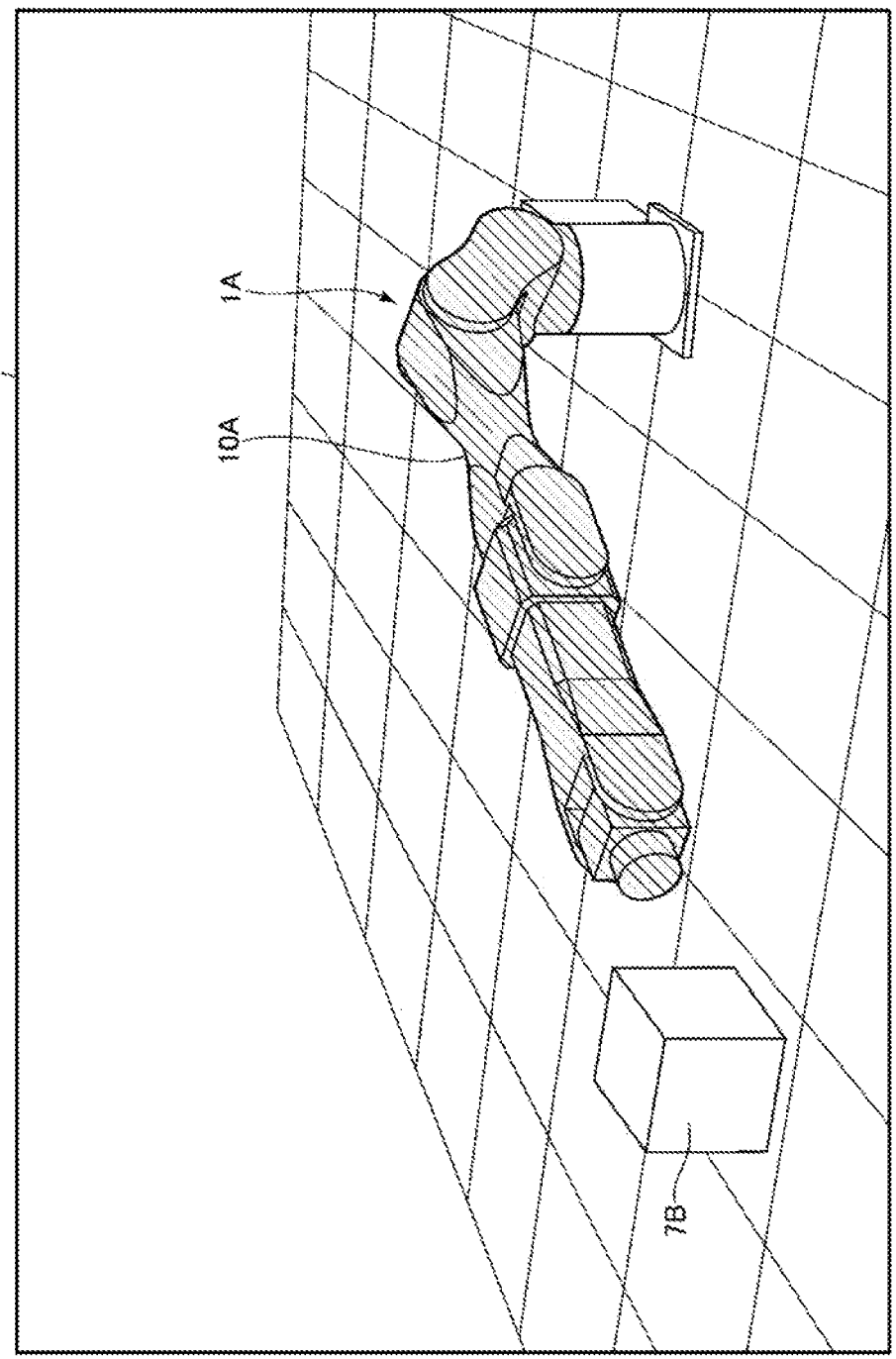
FIG. 13 is a diagram showing the simulation moving image displayed on the display section.

When determining in step S307 that the position and the posture of the robot arm 10 detected in step S306 are not located within the movable range of the robot arm 10, in step S310, the control device 5 displays the position and the posture of the virtual robot arm 10A without updating the position and the posture. At this time, as shown in FIG. 13, the control device 5 changes or flashes a color of the virtual robot arm 10A to notify that the position and the posture of the robot arm 10 detected in step S306 are not located within the movable range of the robot arm 10. When the teacher moves the teaching jig 7 into the movable range of the robot 1, the control device 5 returns the color of the virtual robot arm 10A to an original color of the virtual robot arm 10A.

The control device 5 sequentially performs step S311, step S312, and step S313. Step S311, step S312, and step S313 are substantially the same as steps S104 to S107 explained in the first embodiment. Therefore, detailed explanation of step S311, step S312, and step S313 is omitted.

Figure 14:
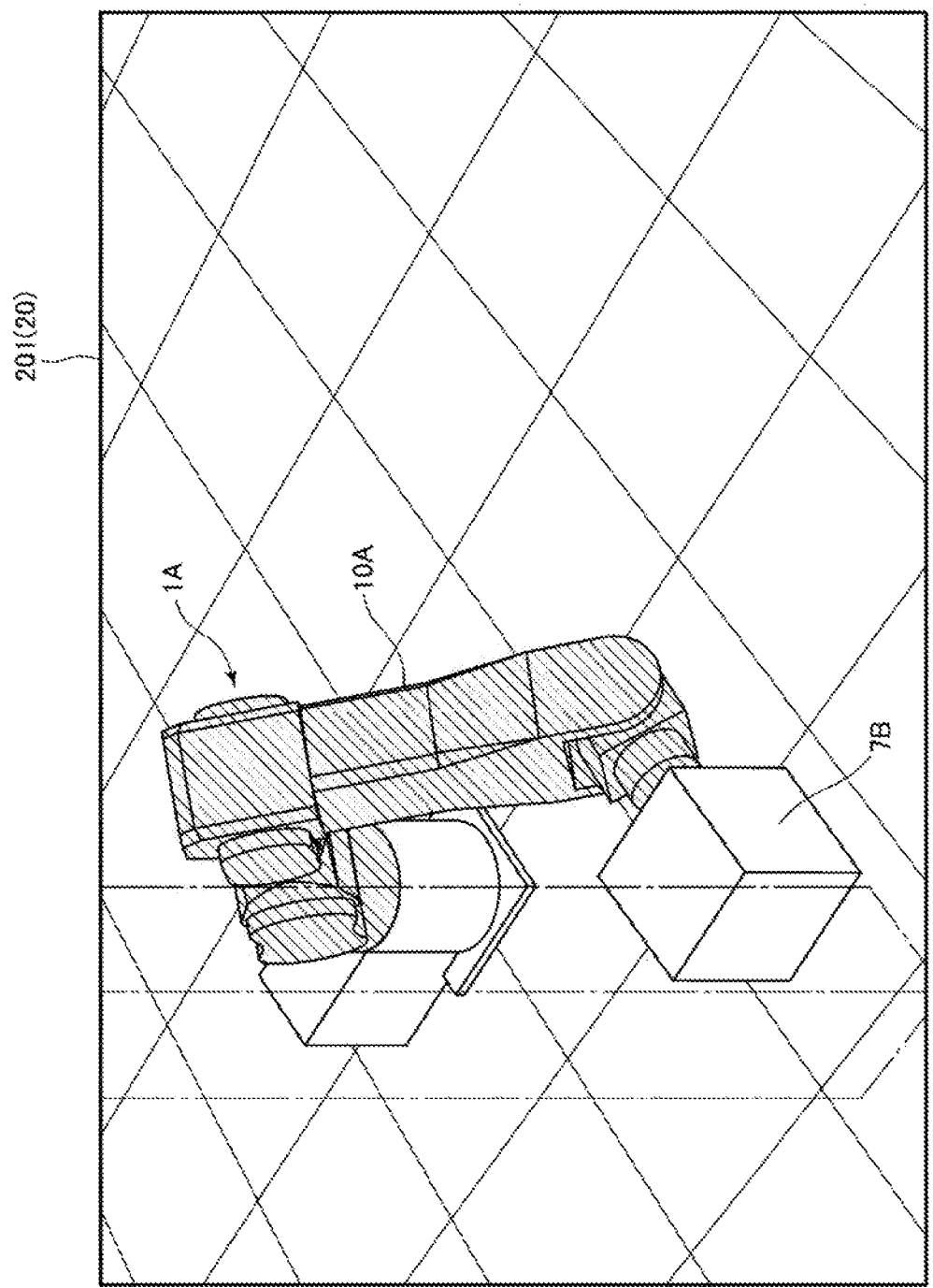
FIG. 14 is a diagram showing the simulation moving image displayed on the display section.

When an obstacle is photographed in an image acquired by the imaging section 6 and the robot 1 and the obstacle come into contact if the robot 1 is driven in the position and the posture of the robot arm 10 detected in step S306, as shown in FIG. 14, it is desirable to change or flash the color of the virtual robot arm 10A to notify that the robot 1 and the obstacle come into contact.

As explained above, in the teaching method according to the present disclosure, the teaching jig 7 is imaged to acquire a captured image, the position and the posture of the teaching jig 7 are detected based on the captured image, the position and the posture of the virtual robot arm 10A are changed and displayed based on a result obtained by the detection to maintain a positional relation between the teaching jig 7 and a control point of the virtual robot arm 10A associated with the position and the posture of the robot arm 10 of the robot 1, and the position and the posture of the virtual robot arm 10A are acquired as teaching information when the control device 5, which controls the operation of the robot 1, acquires a teaching signal. According to the present disclosure, the teacher can perform teaching without applying an external force to the robot arm 10. Therefore, it is possible to reduce a burden on the teacher. Since the teacher can perform teaching without actually moving the robot 1, it is possible to further improve safety.

Modification of the Teaching Jig

Figure 15:
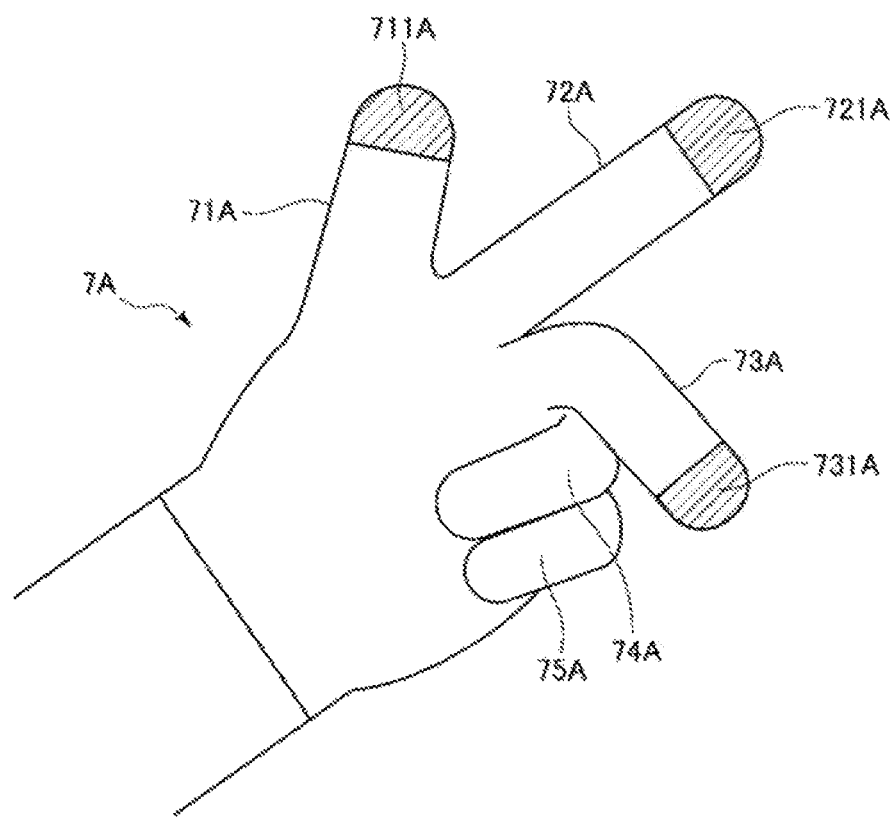
FIG. 15 is a perspective view showing a modification of a teaching jig used in the teaching method according to the present disclosure.

FIG. 15 is a perspective view showing a modification of a teaching jig used for the teaching method according to the present disclosure.

As shown in FIG. 15, a teaching jig 7A is configured by a glove. In other words, the teaching jig 7A includes a first attachment section 71A attached to a first finger, a second attachment section 72A attached to a second finger, a third attachment section 73A attached to a third finger, a fourth attachment section 74A attached to a fourth finger, and a fifth attachment section 75A attached to a fifth finger. The first finger is the thumb, the second finger is the index finger, the third finger is the middle finger, the fourth finger is the ring finger, and the fifth finger is the little finger.

A marker 711A is provided at the distal end portion on the outer side of the first attachment section 71A. A marker 721A is provided at the distal end portion on the outer side of the second attachment section 72A. A marker 731A is provided at the distal end portion on the outer side of the third attachment section 73A. In this embodiment, the marker 711A, the marker 721A, and the marker 731A are configured by colored sections and have colors different from one another.

By wearing such a teaching jig 7A on the hand, the teacher can detect the position and the posture of the teaching jig 7A based on the captured image acquired in the imaging step. For example, as shown in FIG. 15, by fixing the fingers in a state in which the first to third fingers are set in directions crossing one another, that is, different directions, the teacher can perform accurate teaching.

For example, the position and posture changing step can be performed based on a plane including the marker 711A, the marker 721A, and the marker 731A. When such a teaching jig 7A is used, the same effects as the effects in the first to third embodiments are obtained. When the teaching jig 7A is used, an operation section is separately provided.

Markers may be provided in the fourth attachment section 74A and the fifth attachment section 75A as well without being limited to the configuration shown in FIG. 15. In this case, it is desirable that at least one of colors, patterns, and shapes of the first to fifth attachment sections 71A to 75A are different from one another.

The configuration shown in FIG. 15 is an example. Markers having shapes and patterns different from one another may be provided without being limited to the configuration shown in FIG. 15 if the markers can be distinguished from other markers.

In this way, the teaching jig 7A includes the first attachment section 71A attached to the first finger of the teacher, the second attachment section 72A attached to the second finger of the teacher, and the third attachment section 73A attached to the third finger of the teacher. The first attachment section 71A, the second attachment section 72A, and the third attachment section 73A include the markers having colors, patterns, or shapes different from one another. Consequently, the position and the posture of the teaching jig 7A can be detected in the detecting step. Since the teaching can be performed with one hand, the teacher can more easily perform the teaching.

The teaching method according to the present disclosure is explained above based on the embodiments shown in the figures. However, the present disclosure is not limited to this. The steps can be replaced with any steps having the same functions. Any other steps may be added to the present disclosure. The embodiments may be combined as appropriate.

In the embodiments, the so-called six-axis vertical articulated robot is illustrated as the robot included in the robot system according to the present disclosure. However, the robot may be other robots such as a SCARA robot. The robot is not limited to the single-arm robot and may be other robots such as a double-arm robot. Therefore, the number of movable sections is not limited to one and may be two or more. The number of arms of the robot arm included in the movable sections is six in the embodiments but may be one to five or seven or more.

What is claimed is:

1. A teaching method for causing a processor to execute a process, the teaching method comprising executing on the processor the steps of:
    first imaging a teaching jig located at a first position to acquire a first captured image, the teaching jig having a marker on a periphery of the teaching jig, the teaching jig being configured to be moved by an operator, the first captured image including an image of the marker;
    first detecting a first coordinate of the first position and a first posture of the teaching jig based on the first captured image and a robot coordinate system;

first moving a robot arm of a robot toward the teaching jig located at the first position based on the detected first coordinate, the detected first posture, and the robot coordinate system;

first stopping the first movement of the robot arm and acquiring a first teaching signal when the processor determines that a first relative locational relationship between the robot arm and the teaching jig at the first position is a predetermined relation, the first teaching signal including first teaching information relating to the detected first coordinate, the detected first posture, and the first relative locational relationship, moving the teaching jig to a second position from the first position and stopping the teaching jig at the second position after the first teaching signal is acquired;

second imaging the teaching jig at the second position to acquire a second captured image;

second detecting a second coordinate of the second position and a second posture of the teaching jig based on the second captured image and the robot coordinate system;

second moving the robot arm toward the teaching jig located at the second position based on the detected second coordinate, the detected second posture, and the robot coordinate system;

second stopping the second movement of the robot arm and acquiring a second teaching signal when the processor determines that a second relative locational relationship between the robot arm and the teaching jig at the second position is the predetermined relation, the second teaching signal including second teaching information relating to the detected second coordinate, the detected second posture, and the second relative locational relationship; and operating the robot arm based on the first and second teaching information.

2. The teaching method according to claim 1, wherein the marker includes a first marker and a second marker different from the first marker, the teaching jig includes a first surface and a second surface, and the first marker is disposed on the first surface, and the second marker disposed on the second surface.

3. The teaching method according to claim 1, wherein the marker includes a first marker, a second marker, and a third marker having colors, patterns, or shapes different from one another, the teaching jig is attachable to a hand of the operator, the teaching jig includes a first attachment section attached to a first finger of the operator, a second attachment section attached to a second finger of the operator, and a third attachment section attached to a third finger of the operator, and the first attachment section, the second attachment section, and the third attachment section include the first, second, and third markers, respectively.

4. The teaching method according to claim 1, wherein the processor determines that each of the first relative locational relationship and the second relative locational relationship is the predetermined relation when the processor receives an operation signal from an operation switch operable by the operator.

5. The teaching method according to claim 4, wherein the operation switch is provided in the teaching jig.

6. The teaching method according to claim 1, further comprising a notifying section provided in the teaching jig, wherein the processor is configured to send a completion signal to the notifying section when the processor acquires the first teaching signal or the second teaching signal so as to notify the operator completion of a teaching ration of the robot.

7. A teaching method for causing a processor to execute a process, the teaching method comprising executing on the processor the steps of:

first detecting a first coordinate of a first position and a first posture of a teaching jig based on first sensor information output by a sensor provided in the teaching jig and a robot coordinate system while the teaching jig is placed at the first position, the teaching jig being configured to be moved by an operator;

first moving a robot arm of a robot toward the teaching jig located at the first position based on the detected first coordinate the detected first posture, and the robot coordinate system;

first stopping the first movement of the robot arm and acquiring a first teaching signal when the processor determines that a first relative locational relationship between the robot arm and the teaching jig at the first position is a predetermined relation, the first teaching signal including first teaching information relating to the detected first coordinate, the detected first posture, and the first relative locational relationship;

moving the teaching jig to a second position from the first position and stopping the teaching jig at the second position after the first teaching signal is acquired;

second detecting a second coordinate of the second position and a second posture of the teaching jig based on second sensor information output by the sensor provided in the teaching jig and the robot coordinate system while the teaching jig is placed at the second position;

second moving the robot arm toward the teaching jig located at the second position based on the detected second coordinate, the detected second posture, and the robot coordinate system;

second stopping the second movement of the robot arm and acquiring a second teaching signal when the processor determines that a second relative locational relationship between the robot arm and the teaching jig at the second position is the predetermined relation, the second teaching signal including second teaching information relating to the detected second coordinate, the detected second posture, and the second relative locational relationship; and operating the robot arm based on the first and second teaching information.

8. A teaching method for causing a processor to execute a process, the teaching method comprising executing on the processor the steps of:

first imaging a teaching jig located at a first position to acquire a first captured image, the teaching jig having a marker on a periphery of the teaching jig, the teaching jig being configured to be moved by an operator, the first captured image including an image of the marker;

first detecting a first coordinate of the first position and a first posture of the teaching jig based on the first captured image and a robot coordinate system;

displaying a virtual robot arm of a virtual robot and a virtual teaching jig at the first position on a display based on the first captured image and the robot coordinate system, the virtual robot arm of the virtual robot and the virtual teaching jig corresponding to a robot arm of a robot and the teaching jig;

first moving the robot arm of the robot toward the teaching jig located at the first position based on the detected first coordinate, the detected first posture, and the robot coordinate system;

first stopping the first movement of the robot arm and acquiring a first teaching signal when the processor determines that a first relative locational relationship between the robot arm and the teaching jig at the first position is a predetermined relation, the first teaching signal including first teaching information relating to the detected first coordinate the detected first posture, and the first relative locational relationship;

updating locations of the virtual robot arm of the virtual robot and the virtual teaching jig on the display to correspond to the first relative locational relationship when the first teaching signal is acquired;

changing a display state of the virtual robot arm on the display by either changing a color of the virtual robot arm or by flashing the displayed virtual robot arm without updating the locations of the virtual robot arm of the virtual robot and the virtual teaching jig to correspond to the first relative locational relationship when the first teaching signal is not acquired;

moving the teaching jig to a second position from the first position and stopping the teaching jig at the second position after the first teaching signal is acquired;

second imaging the teaching jig at the second position to acquire a second captured image;

second detecting a second coordinate of the second position and a second posture of the teaching jig based on the second captured image and the robot coordinate system;

displaying the virtual robot arm of the virtual robot and the virtual teaching jig at the second position on the display based on the second captured image and the robot coordinate system;

second moving the robot arm toward the teaching jig located at the second position based on the detected second coordinate, the detected second posture, and the robot coordinate system;

second stopping the second movement of the robot arm and acquiring a second teaching signal when the processor determines that a second relative locational relationship between the robot arm and the teaching jig at the second position is the predetermined relation, the second teaching signal including second teaching information relating to the detected second coordinate, the detected second posture, and the second relative locational relationship;

updating the locations of the virtual robot arm of the virtual robot and the virtual teaching jig on the display to correspond to the second relative locational relationship when the second teaching signal is acquired;

changing the display state of the virtual robot arm on the display without updating the locations of the virtual robot arm of the virtual robot and the virtual teaching jig to correspond to the second relative locational relationship when the second teaching signal is not acquired; and operating the robot arm based on the first and second teaching information.

* * * * *